United States Patent [19]
Yamamoto et al.

[11] Patent Number: 5,510,875
[45] Date of Patent: *Apr. 23, 1996

[54] REPRESENTATION OF DEPTH OF FIELD IN CAMERA

[75] Inventors: Masato Yamamoto, Saitama; Toshimasa Yamanaka, Tokyo; Masahiro Nakajima, Tokyo; Yutaka Ohsawa, Tokyo, all of Japan

[73] Assignee: Asahi Kogaku Kogyo Kabushiki Kaisha, Tokyo, Japan

[*] Notice: The term of this patent shall not extend beyond the expiration date of Pat. No. 5,019,852.

[21] Appl. No.: 159,106

[22] Filed: Nov. 30, 1993

Related U.S. Application Data

[63] Continuation of Ser. No. 984,496, Dec. 2, 1992, abandoned, which is a continuation of Ser. No. 656,597, Feb. 19, 1991, abandoned, which is a continuation of Ser. No. 324,043, Mar. 16, 1989, Pat. No. 5,019,852.

[30] Foreign Application Priority Data

Mar. 16, 1988 [JP] Japan .................................. 63-63814

[51] Int. Cl.⁶ ............................................ G03B 13/36
[52] U.S. Cl. ..................... 354/409; 354/472; 354/474
[58] Field of Search ........................... 354/409, 465–470, 354/471–475, 289.1, 289.12, 446

[56] References Cited

U.S. PATENT DOCUMENTS

| | | | |
|---|---|---|---|
| 2,949,836 | 8/1960 | Bäab | 354/195.13 |
| 3,076,396 | 2/1963 | Mahn | 354/195.13 |
| 4,678,300 | 7/1987 | Beach | 354/106 X |
| 4,855,782 | 8/1989 | Kobayashi et al. | 354/475 |
| 4,887,108 | 12/1989 | Taniguchi et al. | 354/446 X |
| 5,019,852 | 5/1991 | Yamamoto et al. | 354/409 |

FOREIGN PATENT DOCUMENTS

| | | |
|---|---|---|
| 56-128931 | 10/1981 | Japan . |
| 56-151923 | 11/1981 | Japan . |
| 62-062335 | 3/1987 | Japan . |
| 62-059935 | 3/1987 | Japan . |

*Primary Examiner*—Russell E. Adams
*Attorney, Agent, or Firm*—Greenblum & Bernstein

[57] ABSTRACT

In representing a depth of field in a camera, the depth of field is displayed on the basis of the magnitude of a field depth feeling Df which corresponds to human feeling. The field depth feeling Df is obtained by proccesing at least one of a depth of field on calculation, an object distance, a lens hypen-focal length, a diameter of permissible circle of confusion, a lens aperture value and a lens focal length.

38 Claims, 3 Drawing Sheets

REPRESENTATION OF DEPTH OF FIELD IN CAMERA

This application is a continuation of application Ser. No. 07/984,496, filed Dec. 2, 1992, now abandoned, which is a continuation of application Ser. No. 07/656,597, filed Feb. 19, 1991, now abandoned, which is a continuation of Ser. No. 07/324,043, filed Mar. 16, 1989, now U.S. Pat. No. 5,019,852.

BACKGROUND OF THE INVENTION

This invention relates to a system to represent a depth of field in a camera.

In a single-lens reflex camera, the most important feature resides in the fact that a finished condition of a photograph can visually be estimated before actually taken. The feature is based on information relying primarily upon characteristics of a lens system such as a depth of field, framing and so on.

The depth of field is a distance in front of and in rear of a specific object viewed in focus, on a photograph taken with the object focalized. The depth of field is determined depending upon a diameter of a permissible circle of confusion, an aperture value, a lens focal length and a distance to an object (hereinafter referred to as "object distance"). In the single-lens reflex camera, the depth of field can be visually ascertained through a finder, when actually stopping down the lens system to the corresponding aperture value. Since, however, a finder image becomes dark in proportion to the stopping-down, skill is required to estimate the actual finished condition of a photograph on the basis of the finder image. Further, when the lens system is stopped down, roughness of a focusing glass is emphasized, and a pattern of a reflex mirror is seen in a recent multi-function camera. Thus, it is difficult to ascertain the depth of field.

In view of the above circumstances, a display device has conventionally been proposed, as disclosed in Japanese Patent Provisional Publication Nos. SHO62-59935 and SHO62-62335, in which a depth of field capable of being obtained by calculation is displayed as a numerical value or a range. There have been some display devices put into practice. However, further skill is required to estimate an actual finished condition of a photograph, on the basis of the depth of field displayed by the numerals. For example, even if the depth of field is the same, the impression on an actual photograph taken with respect to a near object and that taken with respect to a remote object are entirely different from each other, so that it is difficult to estimate the finished condition of the photograph only on the basis of the depth of field displayed as a numerical value or a range. That is, since the depth of field displayed as the numerical value is a numerical value which is influenced by the above factors, there would arise a great disparity between the numerical value and the impression of the actually taken photograph. After all, the conventional numerical display of the depth of field makes no sense unless the display is corrected on the basis of the user's experience.

SUMMARY OF THE INVENTION

It is therefore an object of this invention to provide an improved representation of a depth of field, which is more in conformity with human feeling.

Specifically, in this invention, at least one of a depth of field on calculation, an object distance, a lens hyper-focal length, a diameter of a permissible circle of confusion, a lens aperture value and a lens focal length is synthetically judged to sensuously represent a depth of field which corresponds to human feeling.

The field depth feeling Df, according to this invention, can be defined as follows:

Option 1

$$Df=l/D$$

where, l: a depth of field on calculation; and
D: an object distance.

Option 2

$$Df=(2 \cdot D \cdot \delta \cdot F)/f^2$$

where, $\delta$: a diameter of a permissible circle of confusion
F: a stop-down aperture value; and
f: a lens focal length.

Option 3

$$Df=(D \cdot \delta \cdot F)/f$$

Option 4

$$Df=f/(\delta \cdot F)$$

Option 5

$$Df=F/F_o$$

where, $F_o$: an open aperture value.

Most briefly, the field depth feeling Df can be represented by one or two display segments. That is, in case of a single display segment, two states as to whether the depth of field is deep or shallow can be displayed by turning-on and -off of the single display segment. On the other hand, in case of two display segments, two states as to whether the depth of field is deep or shallow can be displayed by turning-on of a selected one of the two display segments.

Preferably, three or more display segments, and more preferably, seven through eleven display segments are arranged. In this case, the display segments should selectively be turned on in accordance with a value of the field depth feeling Df. The display segments may be turned on on the inside of or on the outside of a finder.

More specifically, when it is supposed that a numerical value at the time a difference between minimum and maximum values of a field depth feeling Df to be considered is divided by the number of the display segments is an allotted Df value of each display segment, the display elements can be arranged in order from a small one of the allotted Df values. Theoretically, the field depth feeling Df takes a value from 0 (zero) to infinity (0<Df<∞). However, there is a limit in the shortest object distance, and there is not much point in considering the Df in a range equal to or larger than the object distance near the pan-focus. By this reason, the maximum and minimum values of the field depth feeling Df to be considered are set beforehand lens system to lens system.

Alternatively, with respect to a field depth feeling Df, Dfs is defined as being equal to Df multiplied by N (Dfs=Df·N), the number of the display segments is so determined as to satisfy the expression $\log_a Dfs \leq n \leq \log_a Dfs+1$, and the display segments are arranged in order from a small one of the allotted Df values in accordance with the magnitude of the Dfs. If a is 2 (two) or 3 (three), and if $N=10^a$, there is provided representation most approximate to human feeling.

Furthermore, the field depth feeling in the invention may be displayed in a step-less manner.

BRIEF DESCRIPTION OF THE ACCOMPANYING DRAWINGS

FIGS. 2A and 2B are graphical representations of examples of a field depth feeling in the invention and display segments turned on;

DESCRIPTION OF THE EMBODIMENTS

First, inventors of this application have repeated trial and error on the basis of such conception that, when it is supposed that a depth of field of a near object and a field of depth of a remote object are the same in value as each other, the depth of field is further evaluated depending upon an object distance. As the result of the trial and error, the inventors have found the fact that, if a value at the time the field of depth is divided by an object distance is utilized, it is possible to represent the depth of field having incorporated therein information on an object distance, a lens focal length and an aperture value. Such a principle has been found that, when the value based on the division is small, a depth of focus is shallow, while when the value is large, the depth of focus is deep. When a user desires to take a photograph emphasized in fuzzy feeling, the above various elements are so set as to reduce the value based on the division, while when the user desires to take a pan-focus photograph, the elements are so set as to increase the value.

In this case, a value l/D at the time a depth of field l on calculation is divided by an object distance D is defined as being a field depth feeling Df. As will be clear from the definition, the field depth feeling Df is an abstract number having no dimension of the distance (length). When the numerical value of the field depth feeling Df is small, fuzzy feeling is emphasized, while the larger the numerical value, the stronger the degree of pan-focus.

What forms a basis, on which a field depth feeling Df defined in the embodiment is obtained, is the following general calculating equation of a depth of field l:

$$l = (Dh \cdot D)/(Dh - D) - (Dh \cdot D)/(Dh + D) \quad (1)$$
$$= \{[(f^2/\delta F) \, D]/(f^2/\delta F) - D\}$$
$$- \{[(f^2/\delta F) \, D]/(f^2/\delta F) + D\}$$

where,

δ: a diameter of a permissible circle of confusion;

f: a focal length of a lens system;

F: an aperture value of the lens system (F-number);

Dh: a hyperfocal length; and

D: an object distance.

D: an object distance.

The field depth feeling Df in the embodiment is a value defined as follows, by the use of the depth of field l:

$$Df=l/D \quad (2)$$

The value of the field depth feeling Df represents that, when the value is small, fuzzy feeling in front of and in rear of an object is large, while when the value is large, the fuzzy feeling is small so that a degree of pan-focus is raised.

As described previously, the magnitude of the field depth feeling Df may be displayed by one or two segments, or by a numerical value. It is practical, however, that three or more, preferably, about seven through eleven display segments are arranged, and the magnitude of the field depth feeling Df is displayed by turning-on of any one of the display segments. In this case, display is basically possible by the following two first and second means. The first means is such that a difference between minimum and maximum values of Df to be considered is divided by the number of the display segments, allotted Df values of the respective display segments are determined in order, and the display segments are arranged in order from a small one of the allotted Df values. Saying briefly in a diagrammatic manner, if the number of the display segments is ten (10), and if the difference between the minimum and maximum values of Df to be considered is one hundred (100), an allotted Df value of each display segment is ten (10) and these ten segments lined up are turned on respectively when Df values are 0 (zero) to 10, 11 to 20, . . . , 81 to 90, and 91 to 100.

Generally, if the number of the display elements is n, and if the difference between the minimum and maximum values of a Df value on calculation to be considered is N, N/n (=α) should be allotted to each display segment. A correction coefficient α varies depending upon the focal distance of a lens system. Generally, the longer the focal length of the lens system, the larger the correction coefficient α.

Figure 1:
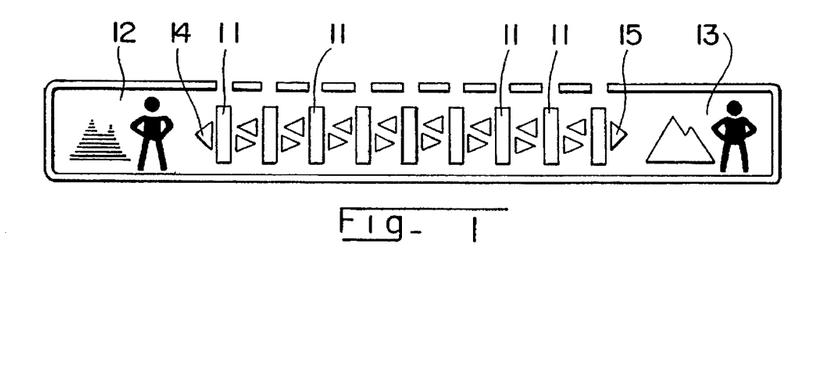
FIG. 1 is a plan view of an example of display segments employed for representing a field of depth in accordance with the invention.

Referring to FIG. 1, there is shown an example of an arrangement of display segments 11. In this example, nine (9) display segments are arranged in a row. Arranged at opposite ends of the row of the display segments 11 are a pictogram 12 of a picture image shallow in depth of field and a pictogram 13 of a picture image deep in depth of field.

The aforesaid equation (2) can be brought to the following more simple approximate expression:

$$Df = l/D \quad (3)$$
$$= (f^2/\delta F)\{1/[(f^2/\delta F) - D] - 1/[(f^2/\delta F) + D]\}$$
$$= (2Df^2/\delta F)\{(f^2/\delta F)^2 - D^2\}^{-1}$$
$$= 2Df^2\{(f^4/\delta F) - \delta FD^2\}^{-1}$$

If it is supposed here that $\delta=3\cdot 10^{-7}$, it can be deemed that δFD is equal to 0 in the usual or ordinary photographing in which the object distance is up to about 10 m. Accordingly, the above equation (3) can be expressed as follows:

$$Df=2D\delta F/f^2(=l/D) \quad (4)$$

The equation (4) represents that, if an aperture value F and a lens focal length f are constant, the field depth feeling Df becomes deep in proportion to an object distance D, and if the object distance D and the lens focal length f are constant, the field depth feeling Df becomes deep in proportion to the aperture value F. Further, if the object distance D and the aperture value F are constant, the field depth feeling Df is in reverse proportion to the square of the focal length f.

From the foregoing, it will be understood that the field depth feeling Df in the invention is approximate to feeling of a depth of field actually felt generally, and corresponds to human feeling.

If the above equations (3) and (4) are solved on the basis of the depth of field l, the following equation is obtained:

$$l=2D^2\delta F/f^2$$

The above equation corresponds to an approximate equation of the depth of field l in which infinitesimal terms of higher order are removed from the equation (1). The depth of field l in the embodiment is a conception including also such an approximate value.

The below tables 1 through 4 indicate the calculation results of the field depth feelings Df(4) conducted respectively on the focal lengths f=24 mm, 35 mm, 50 mm and 200 mm. The calculation is conducted in relation to F-numbers and appropriate object distances, on the basis of the above equation (4). It will be seen from the below tables that a value of the field depth feeling Df has a more linear proportional relationship with respect to F and D when f is small, and the value of the field depth feeling Df becomes apt to be varied depending upon the value of F if f becomes large. By magnifying these values by the correction coefficient $\alpha$, it is made possible sufficiently to display the field depth feeling Df onto the display segments.

TABLE 1-1

| F | Df(4) | Dfs(4) | Df(2) | Dfs(2) | Sn(4) | Sn(2) |
|---|---|---|---|---|---|---|
| f = 24 mm | | | | | | |
| a = 2 | | | | | | |
| D = 2 m | | | | | | |
| 1 | 0.21 | 20.83 | 0.21 | 21.06 | 5 | 5 |
| 1.4 | 0.29 | 29.17 | 0.30 | 29.80 | 5 | 5 |
| 2 | 0.42 | 41.67 | 0.44 | 43.56 | 6 | 6 |
| 2.8 | 0.58 | 58.33 | 0.64 | 63.76 | 6 | 6 |
| 4 | 0.83 | 83.33 | 1.01 | 100.84 | 7 | 7 |
| 5.6 | 1.17 | 116.67 | 1.77 | 176.84 | 7 | 8 |
| 8 | 1.67 | 166.67 | 5.45 | 545.45 | 8 | 10 |
| 11 | 2.29 | 229.17 | −7.32 | −732.32 | 8 | 10 |
| 16 | 3.33 | 333.33 | −1.88 | −187.50 | 9 | 10 |
| 22 | 4.58 | 458.33 | −1.08 | −107.80 | 9 | 10 |
| 32 | 6.87 | 666.67 | −0.66 | −65.93 | 10 | 10 |
| 45 | 9.38 | 937.50 | −0.45 | −44.70 | 10 | 10 |
| D = 4 m | | | | | | |
| 1 | 0.42 | 41.67 | 0.44 | 43.56 | 6 | 6 |
| 1.4 | 0.58 | 58.33 | 0.64 | 63.76 | 6 | 6 |
| 2 | 0.83 | 83.33 | 1.01 | 100.84 | 7 | 7 |
| 2.8 | 1.17 | 116.67 | 1.77 | 176.84 | 7 | 8 |
| 4 | 1.67 | 166.67 | 5.45 | 545.45 | 8 | 10 |
| 5.6 | 2.33 | 233.33 | −6.46 | −646.15 | 8 | 10 |
| 8 | 3.33 | 333.33 | −1.88 | −187.50 | 9 | 10 |
| 11 | 4.58 | 458.33 | −1.08 | −107.80 | 9 | 10 |
| 16 | 6.67 | 666.87 | −0.86 | −65.93 | 10 | 10 |
| 22 | 9.17 | 916.67 | −0.46 | −45.82 | 10 | 10 |
| 32 | 13.33 | 1333.33 | −0.31 | −30.69 | 10 | 10 |
| 45 | 18.75 | 1875.00 | −0.22 | −21.58 | 10 | 10 |

TABLE 1-2

| F | Df(4) | Dfs(4) | Df(2) | Dfs(2) | Sn(4) | Sn(2) |
|---|---|---|---|---|---|---|
| f = 24 mm | | | | | | |
| a = 2 | | | | | | |
| D = 8 m | | | | | | |
| 1 | 0.83 | 83.33 | 1.01 | 100.84 | 7 | 7 |
| 1.4 | 1.17 | 116.67 | 1.77 | 176.84 | 7 | 8 |
| 2 | 1.67 | 166.87 | 5.45 | 545.45 | 8 | 10 |
| 2.8 | 2.33 | 233.33 | −6.46 | −646.15 | 8 | 10 |
| 4 | 3.33 | 333.33 | −1.88 | −187.50 | 9 | 10 |
| 5.8 | 4.67 | 466.67 | −1.05 | −105.00 | 9 | 10 |
| 8 | 6.67 | 666.67 | −0.66 | −65.93 | 10 | 10 |
| 11 | 9.17 | 916.87 | −0.46 | −45.82 | 10 | 10 |
| 16 | 13.33 | 1333.33 | −0.31 | −30.68 | 10 | 10 |
| 22 | 18.33 | 1833.33 | −0.22 | −22.08 | 10 | 10 |
| 32 | 26.67 | 2666.67 | −0.15 | −15.08 | 10 | 10 |
| 45 | 37.50 | 3750.00 | −0.11 | −10.70 | 10 | 10 |

TABLE 1-2-continued

| F | Df(4) | Dfs(4) | Df(2) | Dfs(2) | Sn(4) | Sn(2) |
|---|---|---|---|---|---|---|
| D = 16 m | | | | | | |
| 1 | 1.67 | 166.67 | 5.45 | 545.45 | 8 | 10 |
| 1.4 | 2.33 | 233.33 | −6.46 | −646.15 | 8 | 10 |
| 2 | 3.33 | 333.33 | −1.88 | −187.50 | 9 | 10 |
| 2.8 | 4.67 | 466.67 | −1.05 | −105.00 | 9 | 10 |
| 4 | 6.67 | 666.67 | −0.66 | −65.93 | 10 | 10 |
| 5.6 | 9.33 | 933.33 | −0.45 | −44.92 | 10 | 10 |
| 8 | 13.33 | 1333.33 | −0.31 | −30.69 | 10 | 10 |
| 11 | 18.33 | 1833.33 | −0.22 | −22.08 | 10 | 10 |
| 16 | 26.67 | 2666.67 | −0.15 | −15.08 | 10 | 10 |
| 22 | 38.67 | 3666.67 | −0.11 | −10.94 | 10 | 10 |
| 32 | 53.33 | 5333.33 | −0.08 | −7.51 | 10 | 10 |
| 45 | 75.00 | 7500.00 | −0.05 | −5.34 | 10 | 10 |

TABLE 1-3

| F | Df(4) | Dfs(4) | Df(2) | Dfs(2) | Sn(4) | Sn(2) |
|---|---|---|---|---|---|---|
| f = 24 mm | | | | | | |
| a = 2 | | | | | | |
| D = 32 m | | | | | | |
| 1 | 3.33 | 333.33 | −1.88 | −187.50 | 0 | 10 |
| 1.4 | 4.67 | 466.67 | −1.05 | −105.00 | 9 | 10 |
| 2 | 6.67 | 666.67 | −0.66 | −65.93 | 10 | 10 |
| 2.8 | 9.33 | 933.33 | −0.45 | −44.92 | 10 | 10 |
| 4 | 13.33 | 1333.33 | −0.31 | −30.69 | 10 | 10 |
| 5.6 | 18.67 | 1866.67 | −0.22 | −21.68 | 10 | 10 |
| 8 | 26.67 | 2666.67 | −0.15 | −15.08 | 10 | 10 |
| 11 | 36.67 | 3666.67 | −0.11 | −10.94 | 10 | 10 |
| 16 | 53.33 | 5333.33 | −0.08 | −7.51 | 10 | 10 |
| 22 | 73.33 | 7333.33 | −0.05 | −5.46 | 10 | 10 |
| 32 | 106.67 | 10666.67 | −0.04 | −3.75 | 10 | 10 |
| 45 | 150.00 | 15000.00 | −0.03 | −2.67 | 10 | 10 |

TABLE 2-1

| F | Df(4) | Dfs(4) | Df(2) | Dfs(2) | Sn(4) | Sn(2) |
|---|---|---|---|---|---|---|
| f = 35 mm | | | | | | |
| a = 2 | | | | | | |
| D = 2 m | | | | | | |
| 1 | 0.10 | 9.80 | 0.10 | 9.82 | 4 | 4 |
| 1.4 | 0.14 | 13.71 | 0.14 | 13.78 | 4 | 4 |
| 2 | 0.20 | 19.59 | 0.20 | 19.78 | 5 | 5 |
| 2.8 | 0.27 | 27.43 | 0.28 | 27.95 | 5 | 5 |
| 4 | 0.39 | 39.18 | 0.41 | 40.75 | 6 | 6 |
| 5.6 | 0.55 | 54.86 | 0.59 | 59.32 | 6 | 6 |
| 8 | 0.78 | 78.37 | 0.93 | 92.58 | 7 | 7 |
| 11 | 1.08 | 107.76 | 1.52 | 151.83 | 7 | 8 |
| 16 | 1.57 | 156.73 | 4.06 | 406.20 | 8 | 9 |
| 22 | 2.16 | 215.51 | −13.38 | −1337.61 | 8 | 10 |
| 32 | 3.13 | 313.47 | −2.15 | −215.21 | 9 | 10 |
| 45 | 4.41 | 440.82 | −1.14 | −114.26 | 9 | 10 |
| D = 4 m | | | | | | |
| 1 | 0.20 | 19.59 | 0.20 | 19.78 | 5 | 5 |
| 1.4 | 0.27 | 27.43 | 0.28 | 27.95 | 5 | 5 |
| 2 | 0.39 | 39.18 | 0.41 | 40.75 | 6 | 6 |
| 2.8 | 0.55 | 54.86 | 0.59 | 59.32 | 6 | 6 |
| 4 | 0.78 | 78.37 | 0.93 | 92.58 | 7 | 7 |
| 5.6 | 1.10 | 109.71 | 1.57 | 156.94 | 7 | 8 |
| 8 | 1.57 | 156.73 | 4.06 | 406.20 | 8 | 9 |
| 11 | 2.16 | 215.51 | −13.38 | −1337.61 | 8 | 10 |
| 16 | 3.13 | 313.47 | −2.15 | −215.21 | 9 | 10 |
| 22 | 4.31 | 431.02 | −1.18 | −118.27 | 9 | 10 |
| 32 | 6.27 | 626.94 | −0.71 | −71.03 | 10 | 10 |
| 45 | 8.82 | 881.63 | −0.48 | −47.83 | 10 | 10 |

TABLE 2-2

| F | Df(4) | Dfs(4) | Df(2) | Dfs(2) | Sn(4) | Sn(2) |
|---|---|---|---|---|---|---|
| f = 35 mm | | | | | | |
| a = 2 | | | | | | |
| D = 8 m | | | | | | |
| 1 | 0.39 | 39.18 | 0.41 | 40.75 | 6 | 6 |
| 1.4 | 0.55 | 54.86 | 0.59 | 59.32 | 6 | 6 |
| 2 | 0.78 | 78.37 | 0.93 | 92.58 | 7 | 7 |
| 2.8 | 1.10 | 109.71 | 1.57 | 156.94 | 7 | 8 |
| 4 | 1.57 | 156.73 | 4.06 | 406.20 | 8 | 9 |
| 5.6 | 2.19 | 219.43 | −10.77 | −1077.10 | 8 | 10 |
| 8 | 3.13 | 313.47 | −2.15 | −215.21 | 9 | 10 |
| 11 | 4.31 | 431.02 | −1.18 | −118.27 | 9 | 10 |
| 16 | 6.27 | 626.94 | −0.71 | −71.03 | 10 | 10 |
| 22 | 8.62 | 862.04 | −0.49 | −40.04 | 10 | 10 |
| 32 | 12.54 | 1253.88 | −0.33 | −32.73 | 10 | 10 |
| 45 | 17.63 | 1763.27 | −0.23 | −22.98 | 10 | 10 |
| D = 16 m | | | | | | |
| 1 | 0.78 | 78.37 | 0.93 | 92.58 | 7 | 7 |
| 1.4 | 1.10 | 109.71 | 1.57 | 156.94 | 7 | 8 |
| 2 | 1.57 | 156.73 | 4.06 | 406.20 | 8 | 9 |
| 2.8 | 2.19 | 219.43 | −10.77 | −1077.10 | 9 | 10 |
| 4 | 3.13 | 313.47 | −2.15 | −215.21 | 9 | 10 |
| 5.6 | 4.39 | 438.86 | −1.15 | −115.04 | 9 | 10 |
| 8 | 6.27 | 626.94 | −0.71 | −71.03 | 10 | 10 |
| 11 | 8.62 | 862.04 | −0.49 | −49.04 | 10 | 10 |
| 16 | 12.54 | 1253.88 | −0.33 | −32.73 | 10 | 10 |
| 22 | 17.54 | 1724.08 | −0.24 | −23.52 | 10 | 10 |
| 32 | 25.08 | 2507.76 | −0.16 | −16.05 | 10 | 10 |
| 45 | 35.27 | 3526.53 | −0.11 | −11.38 | 10 | 10 |

TABLE 2-3

| F | Df(4) | Dfs(4) | Df(2) | Dfs(2) | Sn(4) | Sn(2) |
|---|---|---|---|---|---|---|
| f = 35 mm | | | | | | |
| a = 2 | | | | | | |
| D = 32 m | | | | | | |
| 1 | 1.57 | 156.73 | 4.06 | 406.20 | 8 | 9 |
| 1.4 | 2.19 | 219.43 | −10.77 | −1077.10 | 8 | 10 |
| 2 | 3.13 | 313.47 | −2.15 | −215.21 | 9 | 10 |
| 2.8 | 4.39 | 438.86 | −1.15 | −115.04 | 9 | 10 |
| 4 | 6.27 | 626.94 | −0.71 | −71.03 | 10 | 10 |
| 5.6 | 8.78 | 877.71 | −0.48 | −48.07 | 10 | 10 |
| 8 | 12.54 | 1253.88 | −0.33 | −32.73 | 10 | 10 |
| 11 | 17.24 | 1724.08 | −0.24 | −23.52 | 10 | 10 |
| 16 | 25.08 | 2507.76 | −0.16 | −16.05 | 10 | 10 |
| 22 | 34.48 | 3448.16 | −0.12 | −11.64 | 10 | 10 |
| 32 | 50.16 | 5015.51 | −0.08 | −7.99 | 10 | 10 |
| 45 | 70.53 | 7053.06 | −0.06 | −5.68 | 10 | 10 |

TABLE 3-1

| F | Df(4) | Dfs(4) | Df(2) | Dfs(2) | Sn(4) | Sn(2) |
|---|---|---|---|---|---|---|
| f = 50 mm | | | | | | |
| a = 2 | | | | | | |
| D = 2 m | | | | | | |
| 1 | 0.05 | 4.80 | 0.05 | 4.80 | 3 | 3 |
| 1.4 | 0.07 | 6.72 | 0.07 | 6.73 | 3 | 3 |
| 2 | 0.10 | 9.60 | 0.10 | 9.62 | 4 | 4 |
| 2.8 | 0.13 | 13.44 | 0.14 | 13.50 | 4 | 4 |
| 4 | 0.19 | 19.20 | 0.19 | 19.38 | 5 | 5 |
| 5.6 | 0.27 | 26.88 | 0.27 | 27.37 | 5 | 5 |
| 8 | 0.38 | 38.40 | 0.40 | 39.87 | 6 | 6 |
| 11 | 0.53 | 52.80 | 0.57 | 56.76 | 6 | 6 |
| 16 | 0.77 | 76.80 | 0.90 | 90.08 | 7 | 7 |
| 22 | 1.06 | 105.60 | 1.46 | 146.42 | 7 | 8 |
| 32 | 1.54 | 153.60 | 3.74 | 374.47 | 8 | 9 |
| 45 | 2.16 | 216.00 | −12.98 | −1298.08 | 8 | 10 |

TABLE 3-1-continued

| F | Df(4) | Dfs(4) | Df(2) | Dfs(2) | Sn(4) | Sn(2) |
|---|---|---|---|---|---|---|
| D = 4 m | | | | | | |
| 1 | 0.10 | 9.60 | 0.10 | 9.62 | 4 | 4 |
| 1.4 | 0.13 | 13.44 | 0.14 | 13.50 | 4 | 4 |
| 2 | 0.19 | 19.20 | 0.19 | 19.38 | 5 | 5 |
| 2.8 | 0.27 | 26.88 | 0.27 | 27.37 | 5 | 5 |
| 4 | 0.38 | 38.40 | 0.40 | 39.87 | 6 | 6 |
| 5.6 | 0.54 | 53.76 | 0.58 | 57.95 | 6 | 6 |
| 8 | 0.77 | 76.80 | 0.90 | 90.08 | 7 | 7 |
| 11 | 1.06 | 105.60 | 1.46 | 148.42 | 7 | 8 |
| 16 | 1.54 | 153.60 | 3.74 | 374.47 | 8 | 9 |
| 22 | 2.11 | 211.20 | −18.34 | −1834.35 | 8 | 10 |
| 32 | 3.07 | 307.20 | −2.26 | −226.00 | 9 | 10 |
| 45 | 4.32 | 432.00 | −1.18 | −117.85 | 9 | 10 |

TABLE 3-2

| F | Df(4) | Dfs(4) | Df(2) | Dfs(2) | Sn(4) | Sn(2) |
|---|---|---|---|---|---|---|
| f = 50 mm | | | | | | |
| a = 2 | | | | | | |
| D = 8 m | | | | | | |
| 1 | 0.19 | 19.20 | 0.19 | 19.38 | 5 | 5 |
| 1.4 | 0.27 | 26.88 | 0.27 | 27.37 | 5 | 5 |
| 2 | 0.38 | 38.40 | 0.40 | 39.87 | 6 | 6 |
| 2.8 | 0.54 | 53.76 | 0.58 | 57.95 | 6 | 6 |
| 4 | 0.77 | 76.80 | 0.90 | 90.08 | 7 | 7 |
| 5.6 | 1.08 | 107.52 | 1.51 | 151.23 | 7 | 8 |
| 8 | 1.54 | 153.60 | 3.74 | 347.47 | 8 | 9 |
| 11 | 2.11 | 211.20 | −18.34 | −1834.35 | 8 | 10 |
| 16 | 3.07 | 307.20 | −2.26 | −226.00 | 9 | 10 |
| 22 | 4.22 | 422.40 | −1.22 | −122.06 | 9 | 10 |
| 32 | 6.14 | 614.40 | −0.73 | −72.82 | 10 | 10 |
| 45 | 8.64 | 864.00 | −0.49 | −48.92 | 10 | 10 |
| D = 16 m | | | | | | |
| 1 | 0.38 | 38.40 | 0.40 | 39.87 | 6 | 6 |
| 1.4 | 0.54 | 53.76 | 0.58 | 57.95 | 6 | 6 |
| 2 | 0.77 | 76.80 | 0.90 | 90.08 | 7 | 7 |
| 2.8 | 1.08 | 107.52 | 1.51 | 151.23 | 7 | 8 |
| 4 | 1.54 | 153.60 | 3.74 | 374.47 | 8 | 9 |
| 5.6 | 2.15 | 215.04 | −13.78 | −1377.98 | 8 | 10 |
| 8 | 3.07 | 307.20 | −2.26 | −226.00 | 9 | 10 |
| 11 | 4.22 | 422.40 | −1.22 | −122.06 | 9 | 10 |
| 16 | 6.14 | 614.40 | −0.73 | −72.82 | 10 | 10 |
| 22 | 8.45 | 844.80 | −0.50 | −50.16 | 10 | 10 |
| 32 | 12.20 | 1228.80 | −0.33 | −33.44 | 10 | 10 |
| 45 | 17.28 | 1728.00 | −0.23 | −23.46 | 10 | 10 |

| F | Df(4) | Dfs(4) | Df(2) | Dfs(2) | Sn(4) | Sn(2) |
|---|---|---|---|---|---|---|
| f = 50 mm | | | | | | |
| a = 2 | | | | | | |
| D = 32 m | | | | | | |
| 1 | 0.77 | 76.80 | 0.90 | 90.08 | 7 | 7 |
| 1.4 | 1.08 | 107.52 | 1.51 | 151.23 | 7 | 8 |
| 2 | 1.54 | 153.60 | 3.74 | 374.47 | 8 | 9 |
| 2.8 | 2.15 | 215.04 | −13.78 | −1377.98 | 8 | 10 |
| 4 | 3.07 | 307.20 | −2.26 | −226.00 | 9 | 10 |
| 5.6 | 4.30 | 430.08 | −1.19 | −118.67 | 9 | 10 |
| 8 | 6.14 | 614.40 | −0.73 | −72.82 | 10 | 10 |
| 11 | 8.45 | 844.80 | −0.50 | −50.16 | 10 | 10 |
| 16 | 12.29 | 1228.80 | −0.33 | −33.44 | 10 | 10 |
| 22 | 16.90 | 1689.60 | −0.24 | −24.01 | 10 | 10 |
| 32 | 24.58 | 2457.60 | −0.16 | −16.38 | 10 | 10 |
| 45 | 34.56 | 3456.00 | −0.12 | −11.61 | 10 | 10 |

| F | Df(4) | Dfs(4) | Df(2) | Dfs(2) | Sn(4) | Sn(2) |
|---|---|---|---|---|---|---|
| f = 200 mm | | | | | | |
| a = 2 | | | | | | |
| D = 2 m | | | | | | |
| 1 | 0.00 | 0.30 | 0.00 | 0.30 | 0 | 0 |
| 1.4 | 0.00 | 0.42 | 0.00 | 0.42 | 0 | 0 |
| 2 | 0.01 | 0.60 | 0.01 | 0.60 | 0 | 0 |
| 2.8 | 0.01 | 0.84 | 0.01 | 0.84 | 0 | 0 |
| 4 | 0.01 | 1.20 | 0.01 | 1.20 | 1 | 1 |
| 5.6 | 0.02 | 1.68 | 0.02 | 1.68 | 1 | 1 |
| 8 | 0.02 | 2.40 | 0.02 | 2.40 | 2 | 2 |
| 11 | 0.03 | 3.30 | 0.03 | 3.30 | 2 | 2 |
| 16 | 0.05 | 4.80 | 0.05 | 4.80 | 3 | 3 |
| 22 | 0.07 | 8.60 | 0.07 | 6.61 | 3 | 3 |
| 32 | 0.10 | 9.60 | 0.10 | 9.02 | 4 | 4 |
| 45 | 0.14 | 13.50 | 0.14 | 13.58 | 4 | 4 |
| D = 4 m | | | | | | |
| 1 | 0.01 | 0.60 | 0.01 | 0.60 | 0 | 0 |
| 1.4 | 0.01 | 0.84 | 0.01 | 0.84 | 0 | 0 |
| 2 | 0.01 | 1.20 | 0.01 | 1.20 | 1 | 1 |
| 2.8 | 0.02 | 1.88 | 0.02 | 1.68 | 1 | 1 |
| 4 | 0.02 | 2.40 | 0.02 | 2.40 | 2 | 2 |
| 5.6 | 0.03 | 3.36 | 0.03 | 3.36 | 2 | 2 |
| 8 | 0.05 | 4.80 | 0.05 | 4.80 | 3 | 3 |
| 11 | 0.07 | 6.60 | 0.07 | 6.61 | 3 | 3 |
| 16 | 0.10 | 9.60 | 0.10 | 9.62 | 4 | 4 |
| 22 | 0.13 | 13.20 | 0.13 | 13.28 | 4 | 4 |
| 32 | 0.19 | 19.20 | 0.19 | 19.38 | 5 | 5 |
| 45 | 0.27 | 27.00 | 0.28 | 27.50 | 5 | 5 |

TABLE 4-2

| F | Df(4) | Dfs(4) | Df(2) | Dfs(2) | Sn(4) | Sn(2) |
|---|---|---|---|---|---|---|
| f = 200 mm | | | | | | |
| a = 2 | | | | | | |
| D = 8 m | | | | | | |
| 1 | 0.01 | 1.20 | 0.01 | 1.20 | 1 | 1 |
| 1.4 | 0.02 | 1.68 | 0.02 | 1.68 | 1 | 1 |
| 2 | 0.02 | 2.40 | 0.02 | 2.40 | 2 | 2 |
| 2.8 | 0.03 | 3.36 | 0.03 | 3.36 | 2 | 2 |
| 4 | 0.05 | 4.80 | 0.05 | 4.80 | 3 | 3 |
| 5.6 | 0.07 | 6.72 | 0.07 | 6.73 | 3 | 3 |
| 8 | 0.10 | 9.60 | 0.10 | 9.62 | 4 | 4 |
| 11 | 0.13 | 13.20 | 0.13 | 13.28 | 4 | 4 |
| 16 | 0.19 | 19.20 | 0.19 | 19.38 | 5 | 5 |
| 22 | 0.26 | 26.40 | 0.27 | 26.87 | 5 | 5 |
| 32 | 0.38 | 38.40 | 0.40 | 39.87 | 6 | 6 |
| 45 | 0.54 | 54.00 | 0.58 | 58.25 | 6 | 6 |
| D = 16 m | | | | | | |
| 1 | 0.02 | 2.40 | 0.02 | 2.40 | 2 | 2 |
| 1.4 | 0.03 | 3.36 | 0.03 | 3.36 | 2 | 2 |
| 2 | 0.05 | 4.80 | 0.05 | 4.80 | 3 | 3 |
| 2.8 | 0.07 | 6.72 | 0.07 | 8.73 | 3 | 3 |
| 4 | 1.10 | 9.60 | 0.10 | 9.62 | 4 | 4 |
| 5.6 | 0.13 | 13.44 | 0.14 | 13.50 | 4 | 4 |
| 8 | 0.19 | 19.20 | 0.19 | 19.38 | 5 | 5 |
| 11 | 0.26 | 26.40 | 0.27 | 26.87 | 5 | 5 |
| 16 | 0.38 | 38.40 | 0.40 | 39.87 | 6 | 6 |
| 22 | 0.53 | 52.80 | 0.57 | 56.76 | 6 | 6 |
| 32 | 0.77 | 76.80 | 0.90 | 90.08 | 7 | 7 |
| 45 | 1.08 | 108.00 | 1.52 | 152.46 | 7 | 8 |

TABLE 4-3

| F | Df(4) | Dfs(4) | Df(2) | Dfs(2) | Sn(4) | Sn(2) |
|---|---|---|---|---|---|---|
| f = 200 mm | | | | | | |
| a = 2 | | | | | | |
| D = 32 m | | | | | | |
| 1 | 0.05 | 4.80 | 0.05 | 4.80 | 3 | 3 |

TABLE 4-3-continued

| F | Df(4) | Dfs(4) | Df(2) | Dfs(2) | Sn(4) | Sn(2) |
|---|---|---|---|---|---|---|
| 1.4 | 0.07 | 6.72 | 0.07 | 6.73 | 3 | 3 |
| 2 | 0.10 | 9.60 | 0.10 | 9.62 | 4 | 4 |
| 2.8 | 0.13 | 13.44 | 0.14 | 13.50 | 4 | 4 |
| 4 | 0.19 | 19.20 | 0.19 | 19.38 | 5 | 5 |
| 5.8 | 0.27 | 26.88 | 0.27 | 27.37 | 5 | 5 |
| 8 | 0.38 | 38.40 | 0.40 | 39.87 | 6 | 6 |
| 11 | 0.53 | 52.80 | 0.57 | 56.76 | 6 | 6 |
| 16 | 0.77 | 76.80 | 0.90 | 90.08 | 7 | 7 |
| 22 | 1.08 | 105.60 | 1.46 | 146.42 | 7 | 8 |
| 32 | 1.54 | 153.60 | 3.74 | 374.47 | 8 | 9 |
| 45 | 2.16 | 216.00 | −12.08 | −1208.08 | 8 | 10 |

The number of the display segments can be determined also by utilizing logarithms of Df. That is, the field depth feeling Df is defined as follows:

$$Dfs = Df \cdot N \tag{5}$$

Further, the number n of the display segments is determined as follows:

$$\log_a Dfs \leq n \leq \log_a Dfs + 1 \tag{6}$$

n is of course the integer. The display segments are arranged in order from a small one of allotted Df values in accordance with the magnitude of Dfs. If it is supposed that n is 2 or 3 and $N=10^a$, there is provided display most approximate to human feeling.

The reason why Dfs is defined in addition to Df is as follows. That is, although the value of Df satisfies the inequality $0 < Df < \infty$ as described previously, the value of Df is smaller than 1, that is, $Df < 1$ under substantially all conditions of many lens systems. By this reason, if the logarithms of Dfs are taken as they are, the number of the display segment becomes 1.

It is said that the human feeling is approximate to feeling of the logarithm to the base 2 or 3. According to this representation, there is provided a representation most approximate to feeling of human eyes.

The previous tables 1 through 4 indicate also the results of calculation of Df, Dfs and Sn, on the basis of the above equations (2), (4), (5) and (6), with respect to the object distances D=2 m, 4 m, 8 m, 16 m and 32 m of lens systems whose respective focal lengths f are 24 mm, 35 mm, 50 mm and 200 mm. Here, a is equal to 2. Sn represents the number of the segment turned on, when the display segments are nine in number and are arranged in order from a small one of allotted Df values. In this connection, the smaller the numeral, the shallower the depth of field. (2) and (4) affixed to Df, Dfs and Sn represent the number of the calculating equations of the field depth feeling Df on which Df, Dfs and Sn are based respectively. The value [0] of Sn(2) and Sn(4) in the tables indicates that the depth of field is shallowest and, at this time, a triangular segment 14 on the left in FIG. 1 is turned on. Further, the value [10] of Sn(2) and Sn(4) in the tables indicates that the depth of field is deepest (panfocus) and, at this time, a triangular segment 15 on the right in FIG. 1 is turned on.

As will be clear from the above tables, according to the field depth feeling Df in the embodiment, the depth of field judged synthetically on the basis of the object distance, the lens focal length and the aperture value can be displayed sensuously.

Figure 2A:
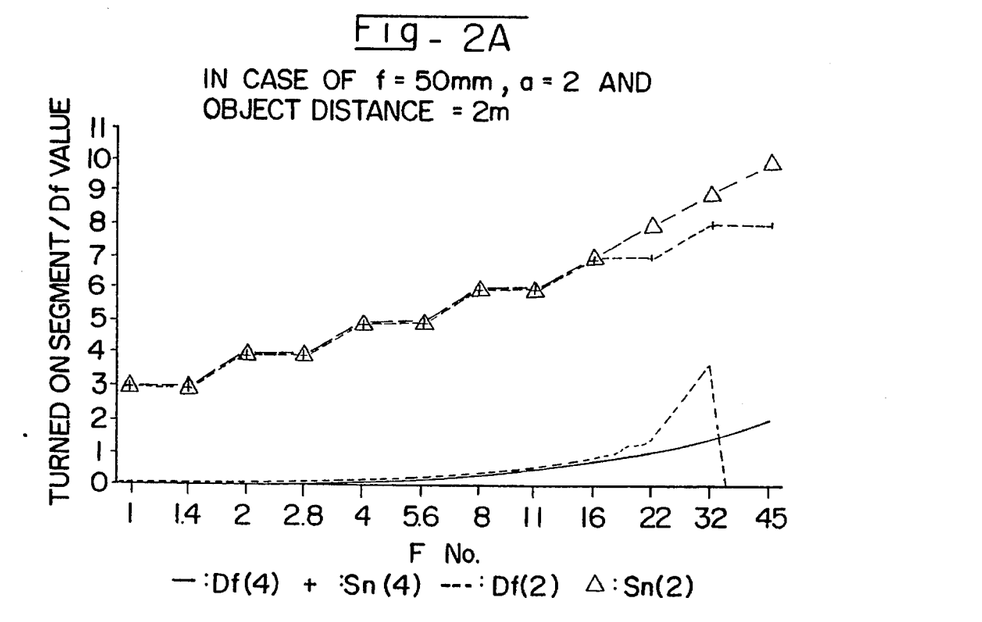

FIG. 2A is a graph in which values of the field depth feeling Df are plotted in case where the focal length f is equal to 50 mm and the object distance D is equal to 2 m.

Figure 2B:
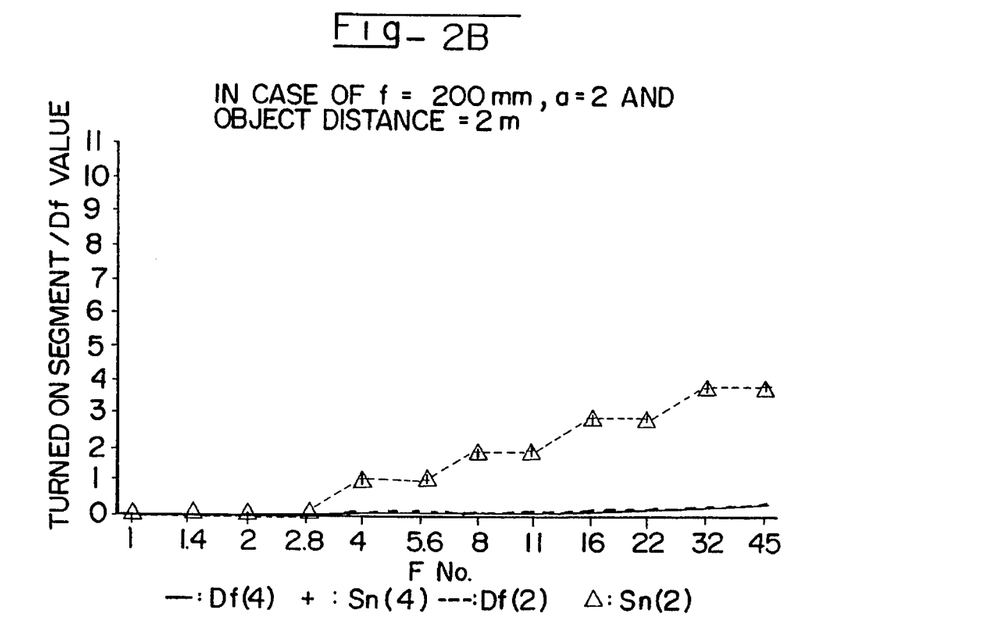

Likewise, FIG. 2B is a graph in case where the focal length f is equal to 200 mm and the object distance is equal to 2 m. It will clearly be seen that the display segments turned on vary correspondingly to variation of the value of Df attendant upon a change in the aperture value.

Figure 3:
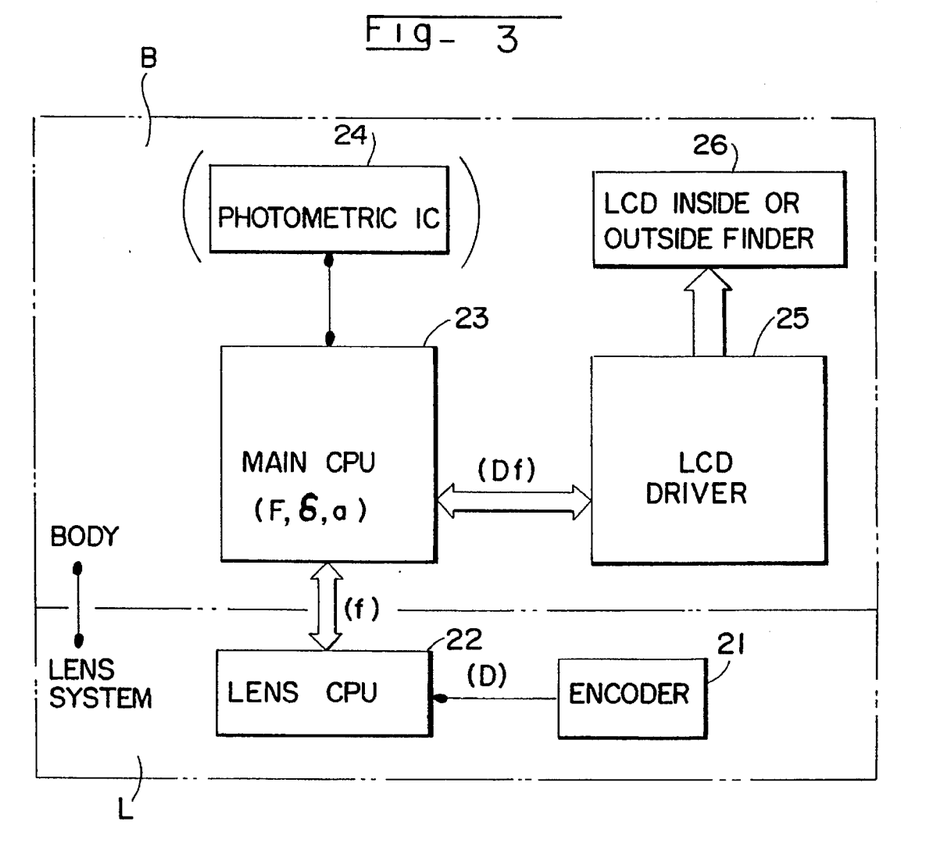
FIG. 3 is a block diagram showing a signal processing system for executing representation according to the invention.

An example of an arrangement for representing the field depth feeling according to the invention will be described with reference to FIGS. 3 and 4. In FIG. 3, arranged on the side of a lens system L are an encoder 21 for detecting the object distance D, and a lens CPU (central processing unit) 22 receiving an output from the encoder 21. Information on the object distance D and the lens focal length f are sent from the lens CPU 22 to a main CPU (central processing unit) 23 on the side of a camera body B. The aforesaid correction coefficient α or N can further be sent from the lens CPU 22. In case the aperture value is manually set, the aperture valve F which corresponds to the rotary position of an aperture ring is sent from the lens system L.

If a shutter-speed priority automatic exposure mode or a programmed automatic exposure mode is selected, the main CPU 23 on the side of the camera body B calculates an aperture value F on the basis of object luminance information from a photometric IC (integrated circuit) 24 arranged within the camera body B. If a manual mode or an aperture-priority automatic exposure mode is selected, the main CPU 23 receives an aperture value F which is sent from the lens system L. In the meantime, if the lens system L is a zoom lens system, the lens system L sends, from the lens CPU 22, the F-number corresponding to its zooming condition to the main CPU 23.

A diameter δ of a permissible circle of confusion is stored in the main CPU 23 as a constant set before hand. The correction coefficient α or N may be stored in the main CPU 23. Factors required for calculation of the field depth feeling Df are inputted to the main CPU 23, and the main CPU 23 calculates the field depth feeling Df. The calculated field depth feeling Df is inputted to an LCD (liquid crystal display) driver 25. The LCD driver 25 supplies a drive signal to a display unit 26 having, for example, the display segments 11 shown in FIG. 1, to turn on a corresponding one of the display segments 11. The display unit 26 may be arranged on the inside of or on the outside of a finder.

Figure 4:
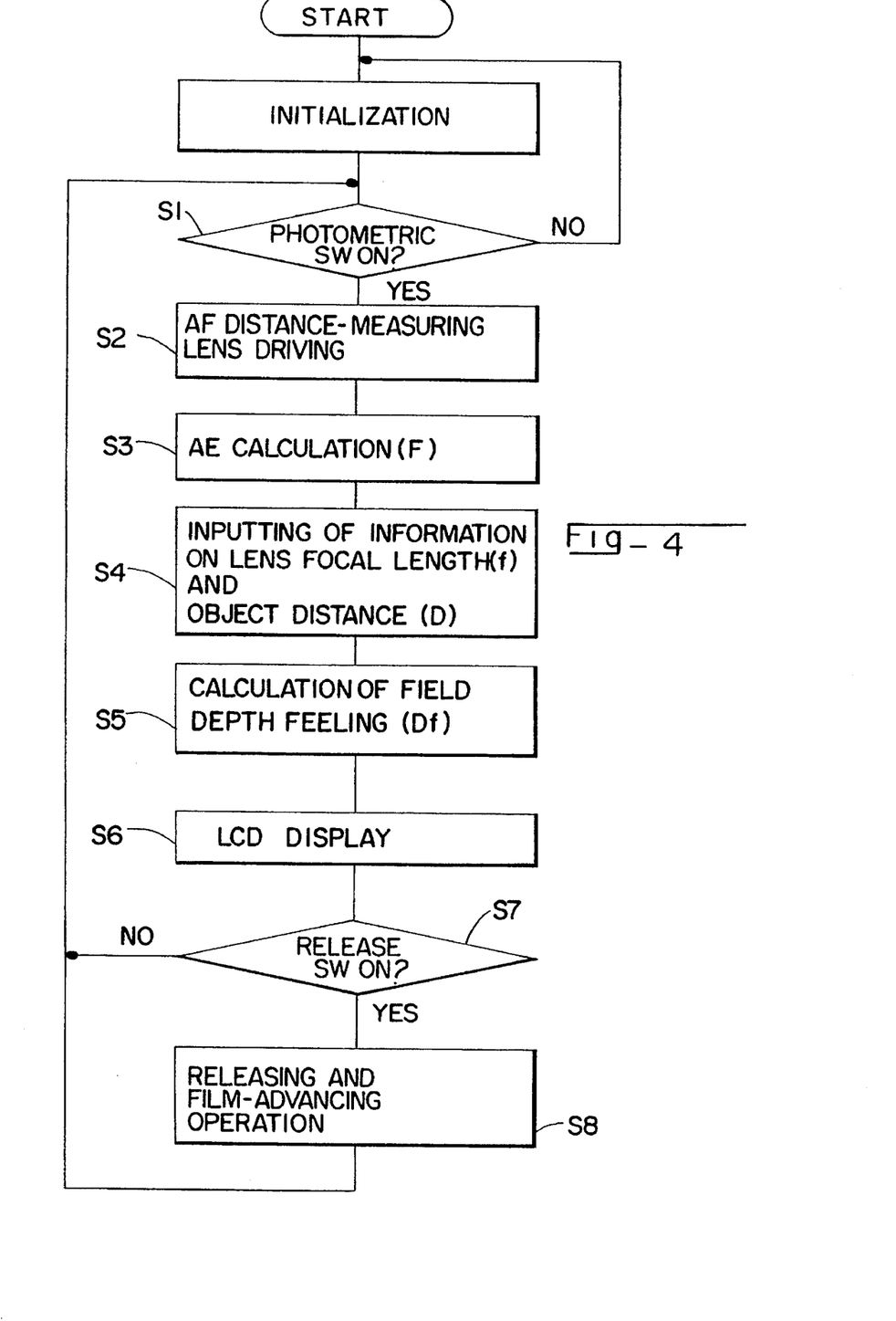
FIG. 4 is a flow chart of the signal processing system.

FIG. 4 shows a flow chart for calculating the field depth feeling Df. The calculation is conducted within the main CPU 23. It is first judged at a step S1 whether or not a photometric switch is switched on. If the judgement at the step S1 is affirmative, an AF (auto-focus) distance measurement is carried out, according to which the lens system L is driven to its in-focus state, at a step S2. Subsequently, the main CPU 23 obtains an aperture value F by AE (auto-exposure) calculation at a step S3 under the shutter-speed priority mode or the programmed mode. At a step S4, the main CPU 23 obtains a lens focal length f and an object distance D from the lens CPU 22 or on the basis of the calculation result at the step S2. The field depth feeling Df is calculated at a step S5. Subsequently, the display unit 26 is driven through the LCD driver 25. Unless the release switch is switched on, the operation described above is repeated. If the release switch is switched on, releasing of a shutter and film advancing are effected, and the program is returned to the initial operation (steps S7 and S8).

The above embodiment of the invention has been described as being applied to a single-lens reflex camera of type in which the lens CPU 22 is arranged on the side of the lens system L. It is to be understood, however, that the invention is not limited to this specific embodiment. In short, essential is that the factors for calculating the field depth feeling Df are inputted to the main CPU 23.

As described above, the arrangement of the above embodiment is such that the depth of field is represented by a new conception called a filed depth feeling having no dimension of the distance, on the basis of synthetic consideration of the lens focal length, the object distance and the aperture value. With such arrangement, the depth of field can be known sensuously, making it possible to reduce elements relying upon the user's experience and feeling. Thus, prior to photographing, it is possible to sensuously have an image of the depth of field of a photograph to be taken.

Similarly, the inventors of this application have repeated trial and error on the basis of such a conception that, the depth of field is inferenced by a lens hyper-focal length. As has been known, the hyper-focal length Dh is represented by the equation of $Dh=f^2/\delta F$ (f: a lens focal length, δ: a diameter of a permissible circle of confusion, and F: an aperture value), and that a zone from the hyper-focal point to the infinity (∞) falls in the depth of focus. That is, smaller the hyper-focal length Dh becomes, deeper the depth of field l, or larger the hyper-focal length Dh becomes, shallower the depth of field l.

As the result of the trial and error, the inventors have found the fact that, the field depth fieling Df may be defined as following two equations:

$$Df=(D\cdot\delta\cdot F)/f^2 \qquad (1)$$

$$Df=f/(\delta\cdot F) \qquad (2)$$

The equation (1) is obtained based upon the conception that the depth of field varies depending upon an in-focus position even if the aperture value F and the lens focal length f are constant. That is, $Df=D/Dh=(D\cdot\delta\cdot F)/f^2$.

The equation (2) is obtained based upon the fact that a perspective feeling P is defined by the equation of $P=(m\cdot f)/D$ (m: image magnification ratio), and that the perspective feeling can correctly be represented on a photograph actually taken in case P=1. When looking an object through a finder, however, as the object distance D and the image magnification ratio m are constant, the perspective feeling P becomes in proportion to the lens focal length f. By dividing the hyper-focal length Dh by the focal length f, the depth of field which is evaluated by the perspective feeling can be obtained as the field depth feeling Df. That is, $Df=Dh/P=Dh/f=f/(\delta\cdot F)$. In this case, the value of the field depth feeling Df is determined based upon the values of the focal length f and the aperture valve F, and do not care about the influence from the variation of the in-focus position. However, this Df value can be used to examine what level of the depth of field could be obtained for the certain object distance.

Furthermore, in the recent single-lens reflex cameras, generally, an object image formed on a focusing glass is observed through a finder while an aperture of a lens system is fully open. That is, confirmed through the finder is the image condition wherein the depth of field is the shallowest. This means that the depth of field in the photograph actually taken is equivalent to or deeper than the condition observed through the finder. Accordingly, the field depth feeling Df can be defined, to be graded based upon a stop-down aperture value F, as follows:

$$Df=F/Fo$$

where,

Fo: an open aperture value:

More, particularly, the field depth feeling Df can be defined by the ratio between the hyper-focal length Dho under the open aperture condition and the hyper-focal length Dhx under the stop-down aperture condition, and Dho and Dhx are represented by the following equations;

$$Dho = f^2/(\delta \cdot Fo)$$

$$Dhx = f^2/(\delta \cdot F)$$

where,

Fo: an open aperture value

F: a stop-down aperture value

Accordingly, $$\begin{aligned} Df &= Dho/Dhx \\ &= (f^2/(\delta \cdot Fo))/(f^2/(\delta \cdot F)) \\ &= F/Fo \end{aligned}$$

With this Df, the difference in magnification of the depth of fieled between the image on the finder and that on the photograph can be represented.

What is claimed is:

1. A method of representing a depth of field in a camera, wherein a field depth factor Df is obtained; said method of representing comprising the steps of processing a calculated depth of field with respect to a predetermined set of photographic parameters, modifying said calculated depth of field, for said predetermined set of photographic parameters, in accordance with at least one of an object distance, a lens hyper-focal length, a diameter of a permissible circle of confusion, a lens aperture value and a lens focal length, to obtain said field depth factor Df for said predetermined set of photographic parameters, and displaying depth of field on the basis of the magnitude of the field depth factor Df that has been obtained.

2. The method according to claim 1, further comprising arranging a single display segment displaying the field depth factor df, and wherein two states respectively representative of deep and shallow depths of field are displayed by turning-on and -off of the display segment.

3. The method according to claim 1, further comprising arranging two display segments displaying the field depth feeling df, and wherein two states respectively representative of deep and shallow depths of field are displayed by turning-on of a selected one of the display segments.

4. The method according to claim 1, further comprising arranging at least three display segments displaying the field depth feeling df, and wherein these display segments are selectively turned on in accordance with values of the field depth feeling Df.

5. The method according to claim 4, further comprising, setting values beforehand of the field depth factor Df which are allotted respectively to the display segments and arranging the display segments are in order from a small one of the allotted Df values.

6. The method according to claim 1, further comprising, arranging a plurality of display segments displaying the field depth factor Df, wherein Dfs is defined as being equal to Df multiplied by N with respect to the field depth factor Df, determining the number of the display segments n as follows:

$$Log_a Dfs \leq n \leq Log_a Dfs + 1$$

and arranging the display segments in order from a small one of their allotted Df values in accordance with the magnitude of the Dfs.

7. The method according to claim 6, further comprising, setting the base a to be one of 2 and 3 and N to be equal to $10^a$.

8. A device for representing a depth of field in a camera which comprises:

calculating means for calculating a field depth factor Df with respect to a predetermined set of photographic parameters, said field depth factor being obtained by processing a calculated depth of field, and modifying said calculated depth of field, for said predetermined set of photographic parameters, in accordance with at least one of an object distance, a lens hyper-focal length, a diameter of a permissible circle of confusion, a lens aperture value and a lens focal length; and display means for displaying depth of field on a basis of a magnitude of the obtained field depth factor Df.

9. The device according to claim 8, wherein said display means includes a single display segment displaying the field depth factor df, and wherein two states respectively representative of deep and shallow depths of field are displayed by turning-on and -off of the display segment.

10. The device according to claim 8, wherein said display means includes two display segments displaying the field depth factor df, and wherein two states respectively representative of deep and shallow depths of field are displayed by turning-on of a selected one of the display segments.

11. The device according to claim 8, wherein said display means includes at least three display segments displaying the field depth factor df, and wherein these display segments are selectively turned on in accordance with values of the field depth factor Df.

12. The device according to claim 11, further comprising predetermined values of the field depth factor Df, which are allotted respectively to said display segments, and wherein said display segments are arranged in order from a smallest one of the predetermined values of the field depth factor Df.

13. The device according to claim 8, wherein said display means includes a plurality of display segments displaying the field depth factor Df in terms of Dfs, wherein Dfs is defined as being equal to Df multiplied by N with respect to the field depth factor Df, wherein the number of the display segments n is determined as follows:

$$log_a Dfs \leq n \leq log_a Dfs + 1$$

and wherein the display segments are arranged in order from a small one of their allotted Df values in accordance with the magnitude of the Dfs.

14. The device according to claim 13, wherein the base a is one of 2 and 3, and N is equal to $10^a$.

15. A method of representing depth of field in a camera comprising the steps of obtaining the field depth factor with respect to a predetermined set of photographic parameters, by processing a calculated depth of field with respect to said set of predetermined photographic parameters, and modifying said calculated depth of field, for said predetermined set of photographic parameters, in accordance with at least one of an object distance, a lens hyper-focal length, a diameter of a permissible circle of confusion, a lens aperture value and a lens focal length, such that the field depth factor bears a predetermined relation to the calculated depth of field; and displaying the depth of field corresponding to the magnitude of the obtained field depth factor.

16. The method of representing depth of field in a camera according to claim 15, and further comprising graphically displaying said depth of field.

17. The method of representing depth of field in a camera according to claim 15, said field depth factor corresponding to an objective human perception of the depth of field.

18. The device according to claim 15, wherein said display means includes two display segments displaying the field depth factor Df, and wherein two field depths states, respectively representative of deep and shallow depths of fields, are displayed by turning on a selected one of said display segments.

19. The device according to claim 15, wherein said display means includes at least three display segments displaying the field depth factor Df, and wherein said display segments are selectively turned ON in accordance with a magnitude of the field depth factor Df.

20. The device according to claim 19, further comprising predetermined values of the field depth factor DF, which are associated respectively with said display segments, and wherein said display segments are arranged in order from a smallest one of the predetermined values of the field depth factor DF.

21. Apparatus for representing depth of field in a camera, said apparatus comprising:

calculating means for calculating a field depth factor, with respect to a predetermined set of photographic parameters, said field depth factor obtained by processing, via said calculating means, a calculated depth of field for said predetermined set of photographic parameters, and modifying said calculated depth of field, for said predetermined set of photographic parameters, in accordance with at least one of an object distance, a lens hyper-focal length, a diameter of a permissible circle of confusion, a lens aperture value, and a lens focal length, said field depth factor having a predetermined relation to said calculated depth of field; and display means for displaying the depth of field corresponding to the magnitude of the obtained field depth factor.

22. The apparatus for representing depth of field in a camera according to claim 21, wherein said display means graphically displays the depth of field.

23. The apparatus for representing depth of field in a camera according to claim 21, wherein said depth of field factor corresponds to an objective human perception of depth of field.

24. A method of representing depth of field in a camera, wherein a field depth factor comprises an indication corresponding to the actual finished condition of a picture, if a picture is taken under a predetermined set of photographic parameters, and wherein the field depth factor is obtained by the steps of processing a calculated depth of field for said predetermined set of photographic parameters, modifying said calculated depth of field, for said predetermined set of photographic parameters, in accordance with at least one of a plurality of parameters influencing depth of field, and displaying an indication of the depth of field corresponding to the magnitude of the field depth factor obtained.

25. The method of representing depth of field in a camera according to claim 24, wherein said step of modifying said calculated depth of field in accordance with at least one of a plurality of parameters influencing depth of field includes, modifying said calculated depth of field in accordance with at least one of an object distance, a lens hyper-focal length, a diameter of a permissible circle of confusion, a lens aperture value, and a lens focal length.

26. The method of representing depth of field in a camera according to claim 24, further comprising graphically displaying the indication of depth of field.

27. The method of representing depth of field in a camera according to claim 24, comprising obtaining a sensual estimate corresponding to an actual finished depth of field condition of a picture.

28. The apparatus for representing depth of field in a camera according to claim 27, wherein said plurality of parameters influencing depth of field includes an object distance, a lens hyper-focal length, a diameter of a permissible circle of confusion, a lens aperture value, and a lens focal length.

29. Apparatus for representing depth of field in a camera, said apparatus comprising:

means for calculating a field depth factor by processing a calculated depth of field, with respect to a predetermined set of photographic parameters and modifying said calculated depth of field for said predetermined set of photographic parameters, in accordance with at least one of a plurality of parameters influencing depth of field, said field depth factor having a predetermined relation to said calculated depth of field and comprising an indication corresponding to an actual finished condition of a picture, if the picture were taken under said predetermined set of photographic parameters and means for displaying a depth of field corresponding to a magnitude of said field depth factor.

30. The apparatus for representing depth of field in a camera according to claim 29, wherein said display means graphically displays the depth of field.

31. The apparatus for representing depth of field in a camera according to claim 29, wherein predetermined conditions include an actual finished depth of field condition of the picture.

32. A device for representing a depth of field in a camera which comprises:

calculation means for calculating a field depth factor Df with respect to a predetermined set of photographic parameters, said field depth factor being obtained by processing a value substantially equivalent to a calculated depth of field for said predetermined set of photographic parameters, and modifying said calculated value for said predetermined set of photographic parameters in accordance with at least one of an object distance, a lens hyper-focal length, a diameter of a permissible circle of confusion, a lens aperture value and a lens focal length; and display means for displaying depth of field on a basis of a magnitude of the field depth factor Df.

33. The device for representing depth of field according to claim 32, wherein said value substantially equivalent to a calculated depth of field comprises a value replaceable for the calculated depth of field.

34. The device according to claim 32, wherein said display means includes a single display segment displaying the field depth factor Df and wherein two field depth states, respectively representative of deep and shallow depths of field, are displayed by turning said display segment ON or OFF.

35. The device according to claim 32, wherein said display means includes a plurality of display segments displaying the field depth factor Df in terms of Dfs, wherein Dfs is defined as being equal to Df multiplied by N with respect to the field depth factor Df, wherein the number of the display segments n is determined as follows:

$$Log_a Dfs \leq n \leq Log_a Dfs + 1$$

and wherein the display segments are arranged in order from a smallest one in accordance with the magnitude of a Dfs.

36. The device according to claim 35, wherein the base a is one of 2 and 3, and N is equal to $10^a$.

37. Apparatus for representing depth of field in a camera, said apparatus comprising:

calculating means for calculating a field depth factor, said field depth factor obtained by processing, with respect to a predetermined set of photographic parameters, via said calculating means, a calculated depth of field, and modifying said calculated depth of field, at said predetermined set of photographic parameters, in accordance with at least one of an object distance, a lens hyperfocal length, a diameter of a permissible circle of confusion, a lens aperture value and a lens focal length, said field depth factor being different from said calculated depth of field while having a predetermined relation to said calculated depth of field; and display means for displaying depth of field corresponding to the magnitude of the obtained field depth factor.

38. The apparatus representing depth of field in a camera according to claim 37, said display means graphically displaying the depth of field.

* * * * *

UNITED STATES PATENT AND TRADEMARK OFFICE
CERTIFICATE OF CORRECTION

PATENT NO. : 5,510,875
DATED : April 23, 1996
INVENTOR(S) : M. YAMAMOTO et al.

Page 1 of 2

It is certified that error appears in the above-indentified patent and that said Letters Patent is hereby corrected as shown below:

On the cover, in section [56], "References Cited", "U.S. PATENT DOCUMENTS", insert ---4,341,451   7/1982   Krueger et al.---.

On the cover, in section [57], "ABSTRACT", line 6, change "hypen-focal" to ---hyper-focal---.

At column 13, line 35 (claim 2, line 3), change "df," to ---Df,---.

At column 13, line 40 (claim 3, line 3), change "feeling" to ---factor---.

At column 13, line 40 (claim 3, line 3), change "df," to ---Df,---.

At column 13, line 45 (claim 4, line 3), change "feeling" to ---factor---.

At column 13, line 45 (claim 4, line 3), change "df," to ---Df,---.

At column 13, line 47 (claim 4, line 5), change "feeling" to ---factor---.

At column 14, line 16 (claim 9, line 3), change "df," to ---Df,---.

At column 14, line 21 (claim 10, line 3), change "df," to ---Df,---.

UNITED STATES PATENT AND TRADEMARK OFFICE
CERTIFICATE OF CORRECTION

PATENT NO. : 5,510,875
DATED : April 23, 1996
INVENTOR(S) : M. YAMAMOTO et al.

It is certified that error appears in the above-indentified patent and that said Letters Patent is hereby corrected as shown below:

At column 14, line 26 (claim 11, line 3), change "df," to ---Df,---.

At column 15, line 11 (claim 20, line 2), change "DF," to ---Df,---.

At column 15, line 15 (claim 20, line 6), change "DF." to ---Df.---.

Signed and Sealed this

Tenth Day of June, 1997

BRUCE LEHMAN

*Attest:*

*Attesting Officer*     Commissioner of Patents and Trademarks